(12) United States Patent
Ashibu

(10) Patent No.: US 12,300,923 B2
(45) Date of Patent: May 13, 2025

(54) CONNECTOR

(71) Applicant: Japan Aviation Electronics Industry, Limited, Tokyo (JP)

(72) Inventor: Kenta Ashibu, Tokyo (JP)

(73) Assignee: JAPAN AVIATION ELECTRONICS INDUSTRY, LIMITED, Tokyo (JP)

(*) Notice: Subject to any disclaimer, the term of this patent is extended or adjusted under 35 U.S.C. 154(b) by 410 days.

(21) Appl. No.: 17/967,600

(22) Filed: Oct. 17, 2022

(65) Prior Publication Data

US 2023/0208062 A1 Jun. 29, 2023

(30) Foreign Application Priority Data

Dec. 28, 2021 (JP) ................................ 2021-213866

(51) Int. Cl.

*H01R 13/15* (2006.01)
*H01R 13/05* (2006.01)
*H01R 13/42* (2006.01)
*H01R 13/502* (2006.01)
*H01R 13/627* (2006.01)
*H01R 13/516* (2006.01)

(52) U.S. Cl.

CPC ............ *H01R 13/15* (2013.01); *H01R 13/05* (2013.01); *H01R 13/42* (2013.01); *H01R 13/502* (2013.01); *H01R 13/6276* (2013.01); *H01R 13/516* (2013.01)

(58) Field of Classification Search

CPC ........ H01R 13/15; H01R 13/05; H01R 13/42; H01R 13/502; H01R 13/6276; H01R 13/516; H01R 13/187; H01R 13/113; H01R 13/02; H01R 4/5058; H01R 13/40; H01R 13/629; H01R 13/2407; H01R 13/58

See application file for complete search history.

(56) References Cited

U.S. PATENT DOCUMENTS

| | | | | |
|---|---|---|---|---|
| 4,373,764 | A * | 2/1983 | Ulrich | H01R 12/85 29/854 |
| 8,662,916 | B2 * | 3/2014 | Ashibu | H01R 12/88 439/495 |
| 10,833,440 | B2 * | 11/2020 | Beck | H01R 39/643 |
| 2019/0214760 | A1 * | 7/2019 | Beck | H01R 13/2485 |

(Continued)

FOREIGN PATENT DOCUMENTS

| | | |
|---|---|---|
| DE | 44 15 022 A1 | 3/1995 |
| JP | 201967499 A | 4/2019 |
| JP | 2019-083146 A | 5/2019 |

*Primary Examiner* — Abdullah A Riyami
*Assistant Examiner* — Nader J Alhawamdeh
(74) *Attorney, Agent, or Firm* — MUNCY, GEISSLER, OLDS & LOWE, P.C.

(57) ABSTRACT

A connector includes a connector terminal having a flat connection surface that faces a counter connector terminal, at least one spherical ball disposed on the connection surface, at least a surface of the ball having electrical conductivity, a ball retaining portion retaining the ball such that the ball is rotatable, a ball guiding portion fixed to the connector terminal and holding the ball retaining portion such that the ball retaining portion is movable in a two-dimensional manner along the connection surface, and a terminal spring pressing the counter connector terminal or the connection surface of the connector terminal in such a direction that the counter connector terminal and the connection surface approach each other.

12 Claims, 8 Drawing Sheets

(56) References Cited

U.S. PATENT DOCUMENTS

| | | | | |
|---|---|---|---|---|
| 2020/0227852 | A1 | 7/2020 | Shimizu | |
| 2023/0208062 | A1* | 6/2023 | Ashibu | H01R 13/113 439/847 |
| 2024/0297452 | A1* | 9/2024 | Ashibu | H01R 13/04 |

* cited by examiner

CONNECTOR

BACKGROUND OF THE INVENTION

The present invention relates to a connector, particularly to a connector having a counter connector terminal housing portion in which a part of a counter connector terminal is inserted.

BACKGROUND ART

Conventionally, there has been known a connector having a metal ball serving as a contact that is movably disposed between a connector terminal and a counter connector terminal for the purpose of reducing sliding resistance of the counter connector terminal inserted into and pulled out from the connector terminal. The connector terminal is electrically connected to the counter connector terminal via the metal ball.

For instance, JP 2019-67499 A discloses a connector in which a connector terminal 2 is electrically connected to a counter connector terminal 3 within a connector housing 1 made of a resin material, as shown in FIG. 16. Three metal balls 5 held by a contact holder 4 and a diagonally wound coil spring 6 are disposed in the connector housing 1, and the connector terminal 2 is pressed against the three metal balls 5 by the diagonally wound coil spring 6 and thereby electrically connected to the counter connector terminal 3 via the three metal balls 5.

The three metal balls 5 are housed together with compression coil springs 8 separately in three contact housing portions 7 formed in the contact holder 4 as shown in FIG. 17. When the counter connector terminal 3 is inserted into the connector housing 1, the three metal balls 5 rotate and move in accordance with movement of the counter connector terminal 3 while elastically compressing the corresponding compression coil springs 8. This structure reduces sliding resistance during insertion of the counter connector terminal 3.

Meanwhile, the three contact housing portions 7 formed in the contact holder 4 extend in parallel along the insertion direction D of the counter connector terminal 3 as shown in FIG. 17. Thus, the three metal balls 5 cannot move in a direction perpendicular to the insertion direction D of the counter connector terminal 3 while being able to rotate and move along the insertion direction D.

Accordingly, when the counter connector terminal 3 receives a certain external force or the like and thereby moves relative to the connector terminal 2 in a direction different from the insertion direction D during insertion of the counter connector terminal 3 into the connector housing 1 or in the state where the connector terminal 2 and the counter connector terminal 3 are connected to each other, sliding resistance cannot be reduced, which may result in lower reliability of electrical connection between the connector terminal 2 and the counter connector terminal 3.

SUMMARY OF THE INVENTION

The present invention has been made to overcome the conventional problem as above and aims at providing a connector that can establish electrical connection between a connector terminal and a counter connector terminal with high reliability even when the counter connector terminal moves relative to the connector terminal in any direction.

A connector according to the invention is a connector having a counter connector terminal housing portion in which a part of a counter connector terminal is inserted, the connector comprising:

- a connector terminal having a connection surface in a flat shape that faces the counter connector terminal inserted in the counter connector terminal housing portion;
- at least one ball in a spherical shape that is disposed on the connection surface, at least a surface of the ball having electrical conductivity;
- a ball retaining portion retaining the ball such that the ball is rotatable in a state where a part of the surface of the ball contacts the connection surface and another part of the surface of the ball facing opposite from the connection surface protrudes;
- a ball guiding portion fixed to the connector terminal and holding the ball retaining portion such that the ball retaining portion is movable in a two-dimensional manner along the connection surface; and
- a terminal spring pressing the counter connector terminal inserted in the counter connector terminal housing portion or the connection surface of the connector terminal in such a direction that the counter connector terminal and the connection surface approach each other,
- wherein the counter connector terminal inserted in the counter connector terminal housing portion is pressed against the connection surface by the terminal spring, contacts a protruding part of the surface of the ball retained by the ball retaining portion, and is electrically connected to the connector terminal via the ball.

DETAILED DESCRIPTION OF THE INVENTION

Embodiments of the present invention are described below with reference to the accompanying drawings.

Embodiment 1

Figure 1:
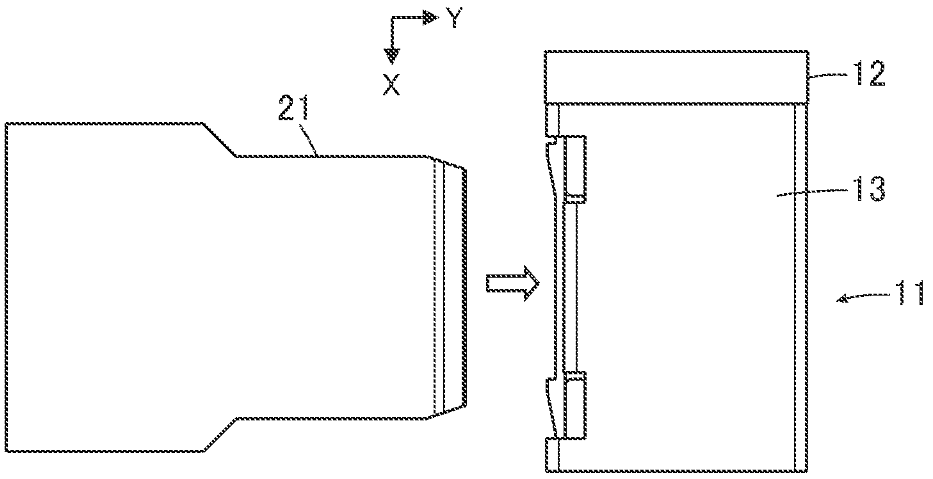
FIG. 1 is a plan view showing a connector according to Embodiment 1 of the invention and a counter connector terminal.

FIG. 1 shows a connector 11 according to Embodiment 1 and a counter connector terminal 21 to be inserted into the connector 11. The connector 11 includes a connector terminal 12 to be electrically connected to the counter connector terminal 21 and a terminal spring retaining portion 13 attached to the connector terminal 12.

Figure 2:
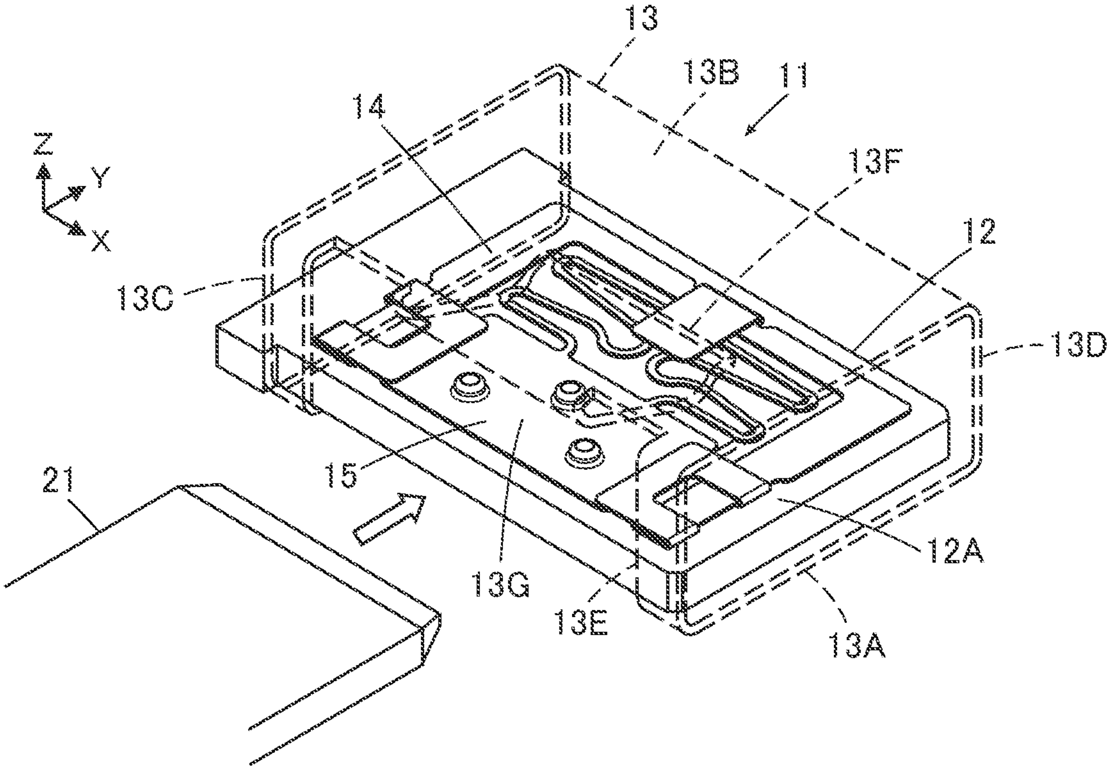
FIG. 2 is a perspective view showing the connector according to Embodiment 1 and the counter connector terminal.

The counter connector terminal 21 is formed from a plug contact having a flat plate shape as shown in FIG. 2. The connector terminal 12 is formed from a socket contact having a flat plate shape as with the counter connector terminal 21, and has a flat connection surface 12A.

Note that the terminal spring retaining portion 13 is illustrated by dashed lines in FIG. 2 to show the inside of the terminal spring retaining portion 13.

For convenience, the flat connection surface 12A of the connector terminal 12 is defined as extending along an XY plane, the direction in which the counter connector terminal 21 is inserted with respect to the connector 11 as a +Y direction, and the direction perpendicular to the connection surface 12A of the connector terminal 12 as a Z direction.

The terminal spring retaining portion 13 is constituted of a plate member such as a metal plate being bent, and has a substantially polygonal tube shape whose central axis extends along the X direction. Specifically, the terminal spring retaining portion 13 includes a bottom plate portion 13A situated on the −Z direction side and extending along an XY plane, a top plate portion 13B situated on the +Z direction side and extending along an XY plane, a front plate portion 13C situated on the −Y direction side and extending along an XZ plane, and a rear plate portion 13D situated on the +Y direction side and extending along an XZ plane.

The front plate portion 13C is provided with an opening 13E into which the counter connector terminal 21 is to be inserted. A terminal spring 13F extending while being bent in the −Z direction and the +Y direction is formed at the −Y directional end of the top plate portion 13B.

The height of the top plate portion 13B in the Z direction with respect to the bottom plate portion 13A has a larger dimension than that of the thickness of the connector terminal 12 in the Z direction, and the terminal spring retaining portion 13 is attached to the connector terminal 12 in such a manner that the connector terminal 12 is situated inside the terminal spring retaining portion 13 to be in contact with the bottom plate portion 13A of the terminal spring retaining portion 13.

A counter connector terminal housing portion 13G into which the counter connector terminal 21 is to be inserted is formed between the terminal spring 13F and the connection surface 12A of the connector terminal 12 inside the foregoing terminal spring retaining portion 13.

A ball guiding portion 14 and a retaining plate 15 held by the ball guiding portion 14 are disposed on the connection surface 12A of the connector terminal 12.

Figure 3:
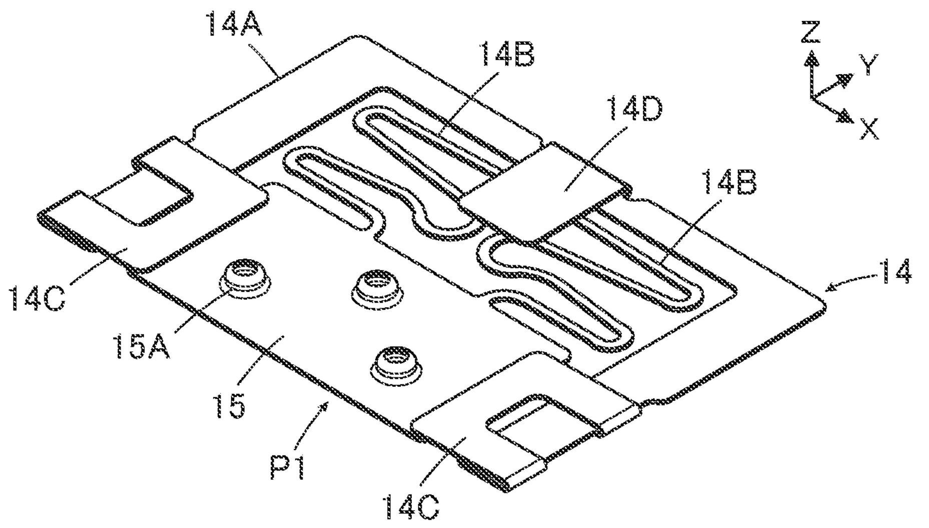
FIG. 3 is a perspective view of a ball guiding portion and a retaining plate held by the ball guiding portion for use in Embodiment 1, as viewed from an obliquely upper portion.
Figure 4:
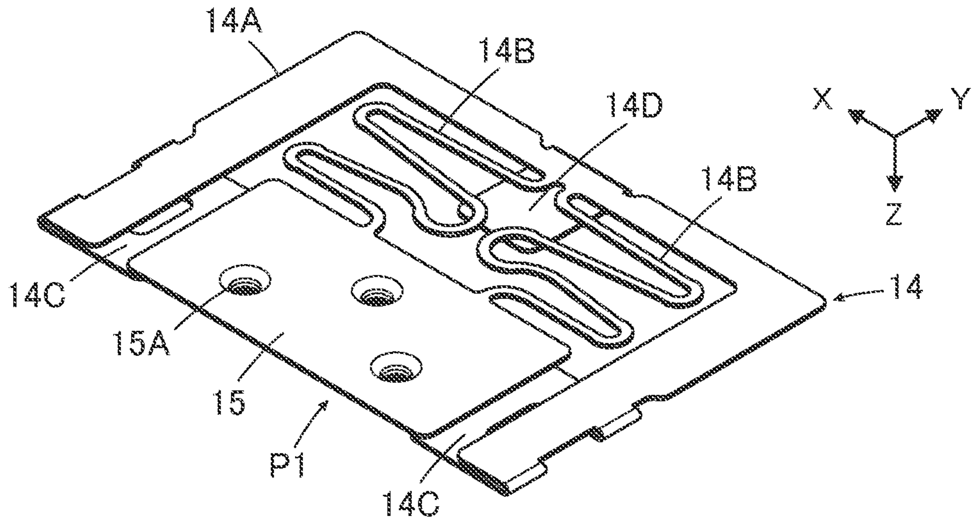
FIG. 4 is a perspective view of the ball guiding portion and the retaining plate held by the ball guiding portion for use in Embodiment 1, as viewed from an obliquely lower portion.

The structures of the ball guiding portion 14 and the retaining plate 15 are shown in FIGS. 3 and 4.

The ball guiding portion 14 is constituted of a plate member such as a metal plate. The ball guiding portion 14 includes a fixed portion 14A having a U-shape that opens in the −Y direction and two return springs 14B that are connected to a +Y direction-side portion of the fixed portion 14A and extend toward the inside of the U-shaped fixed portion 14A. The retaining plate 15 in a rectangular shape is connected to the tip ends of the two return springs 14B.

Each return spring 14B is formed of a band-like member bent at plural positions in an XY plane and is elastically deformable in the XY plane.

A pair of retaining plate keeping portions 14C in a rectangular shape are formed to extend separately from the +X directional end and the −X directional end, on the −Y direction side, of the fixed portion 14A toward the −X direction and the +X direction along the surfaces of the fixed portion 14A and the retaining plate 15 on the +Z direction side. The opposite ends of the retaining plate 15 in the X direction are situated to separately overlie the −Z direction side of the pair of retaining plate keeping portions 14C as shown in FIG. 4.

Further, a return spring keeping portion 14D in a rectangular shape is formed to extend in the −Y direction from the +Y directional end of the fixed portion 14A along the surfaces of the fixed portion 14A and the two return springs 14B on the +Z direction side. A part of the two return springs 14B is situated to overlie the −Z direction side of the return spring keeping portion 14D as shown in FIG. 4.

Since the retaining plate 15 is connected to the tip ends of the two return springs 14B, when an external force acts on the retaining plate 15 along an XY plane, the retaining plate 15 can move relative to the fixed portion 14A. Thus, the retaining plate 15 is held by the ball guiding portion 14 to be movable in a two-dimensional manner in an XY plane.

When moving in an XY plane, the retaining plate 15 is prevented from being displaced in the +Z direction perpendicular to the XY plane owing to the presence of the pair of retaining plate keeping portions 14C because the opposite ends of the retaining plate 15 in the X direction are situated to overlie the −Z direction side of the pair of retaining plate keeping portions 14C.

Likewise, when elastically deforming with the movement of the retaining plate 15 in an XY plane, the two return springs 14B are prevented from being displaced in the +Z direction perpendicular to the XY plane owing to the presence of the return spring keeping portion 14D because a part of the two return springs 14B is situated to overlie the −Z direction side of the return spring keeping portion 14D.

Three ball retaining portions 15A arranged away from one another are formed in the retaining plate 15. Of the three ball retaining portions 15A, two ball retaining portions 15A are situated at positions that are the same in the Y direction and away from each other in the X direction, and the remaining one ball retaining portion 15A is situated at the middle position between the two ball retaining portions 15A in the X direction and at a Y directional position different from that of the two ball retaining portions 15A. In other words, the three ball retaining portions 15A are arranged substantially at three apexes of an isosceles triangle so as not to align in one straight line in an XY plane.

Figure 5:
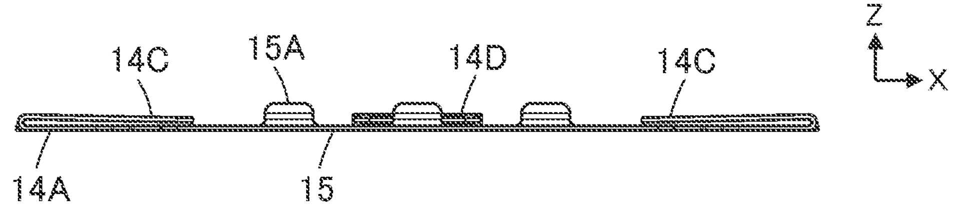
FIG. 5 is a front view of the ball guiding portion and the retaining plate held by the ball guiding portion for use in Embodiment 1.

Each ball retaining portion 15A has a cylindrical shape protruding in the +Z direction as shown in FIGS. 3 and 5 and is configured to be able to house and retain a ball (described later) in its inside.

The fixed portion 14A and the two return springs 14B of the ball guiding portion 14 and the retaining plate 15 configured as above can be integrally formed from, for instance, one metal plate.

However, the fixed portion 14A and the two return springs 14B of the ball guiding portion 14 and the retaining plate 15 may be separately formed first and then joined to one another to form the ball guiding portion 14 and the retaining plate 15.

Figure 6:
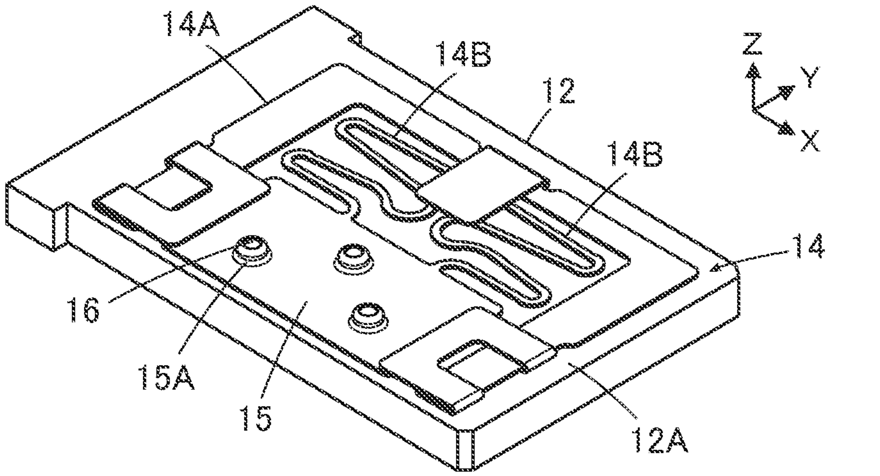
FIG. 6 is a perspective view of a connector terminal, the ball guiding portion fixed to the connector terminal, and the retaining plate held by the ball guiding portion for use in Embodiment 1.

A ball 16 is housed in each of the three ball retaining portions 15A of the retaining plate 15 from the −Z direction; in this state, the ball guiding portion 14 and the retaining plate 15 are disposed on the connection surface 12A of the connector terminal 12, and the fixed portion 14A of the ball guiding portion 14 is welded to the connection surface 12A of the connector terminal 12 at plural positions by, for example, laser welding, whereby the ball guiding portion 14 is fixed to the connector terminal 12 as shown in FIG. 6.

Figure 7:
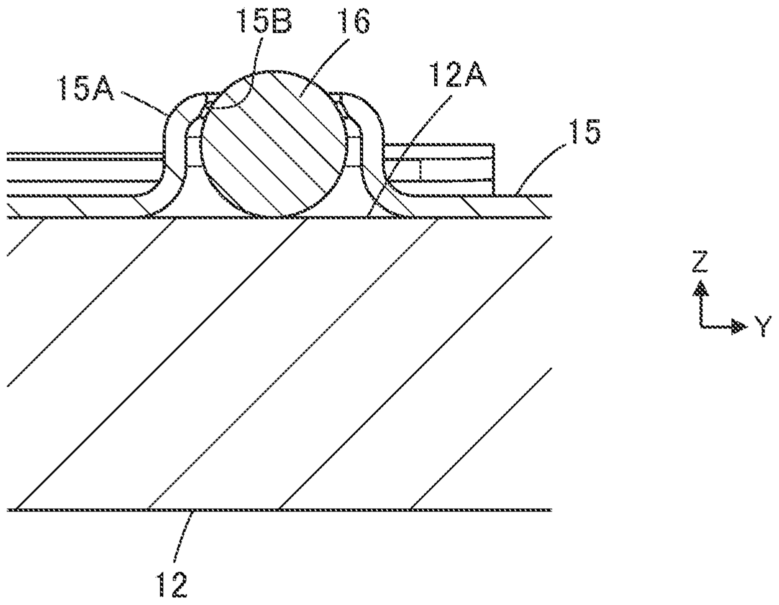
FIG. 7 is a cross-sectional view showing a ball retained in a ball retaining portion.

As shown in FIG. 7, the ball 16 housed in each ball retaining portion 15A is formed from electrically conductive metal to have a spherical shape, and the ball retaining portion 15A is provided with an opening 15B that has a diameter smaller than the diameter of the ball 16 and is situated at a height larger than the radius of the ball 16 and smaller than the diameter of the ball 16 from the connection surface 12A of the connector terminal 12 in the +Z direction. The position where the opening 15B of each ball retaining portion 15A is formed in the retaining plate 15 and the diameter of the opening 15B are determined to allow the ball 16 housed in the ball retaining portion 15A to move slightly and rotate in a space surrounded by the connection surface 12A of the connector terminal 12 and the ball retaining portion 15A.

The ball 16 is prevented from going out of the space surrounded by the connection surface 12A of the connector terminal 12 and the ball retaining portion 15A because the opening 15B of the ball retaining portion 15A has a smaller diameter than the diameter of the ball 16.

Since the ball retaining portion 15A has the opening 15B as above, the −Z directional end of the ball 16 housed in the space surrounded by the connection surface 12A of the connector terminal 12 and the ball retaining portion 15A contacts the connection surface 12A, while the +Z directional end of the ball 16 protrudes from the opening 15B in the +Z direction, as shown in FIG. 7.

It is sufficient for the ball 16 that at least its surface is electrically conductive, and for instance, use may be made of a ball in which an electrically conductive metal layer is formed on a surface of a spherical member made of a nonconductor.

The +Z directional end of the ball 16 retained in the ball retaining portion 15A is situated farther away in the −Z direction than the portion of the terminal spring 13F of the terminal spring retaining portion 13 shown in FIG. 2 that is situated farthest in the −Z direction, and the distance in the Z direction between the +Z directional end of the ball 16 and that portion of the terminal spring 13F is smaller than the thickness of the counter connector terminal 21 of flat plate shape.

Next, the operation of the connector 11 according to Embodiment 1 is described.

Figure 8:
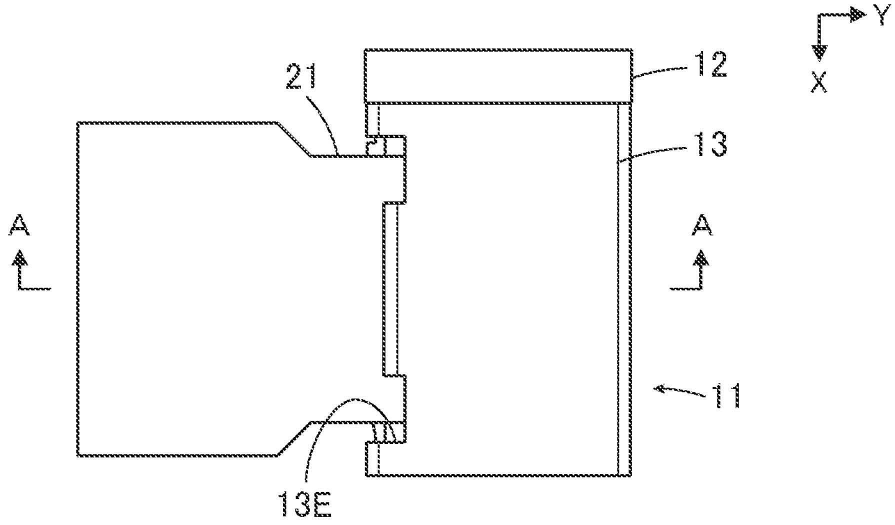
FIG. 8 is a plan view showing a state where the counter connector terminal is inserted in the connector according to Embodiment 1.

To electrically connect the counter connector terminal 21 to the connector terminal 12 of the connector 11, the counter connector terminal 21 shown in FIG. 1 is moved from the −Y direction toward the +Y direction, and the tip end of the counter connector terminal 21 is inserted into the terminal spring retaining portion 13 of the connector 11 through the opening 13E of the terminal spring retaining portion 13 as shown in FIG. 8.

Figure 9:
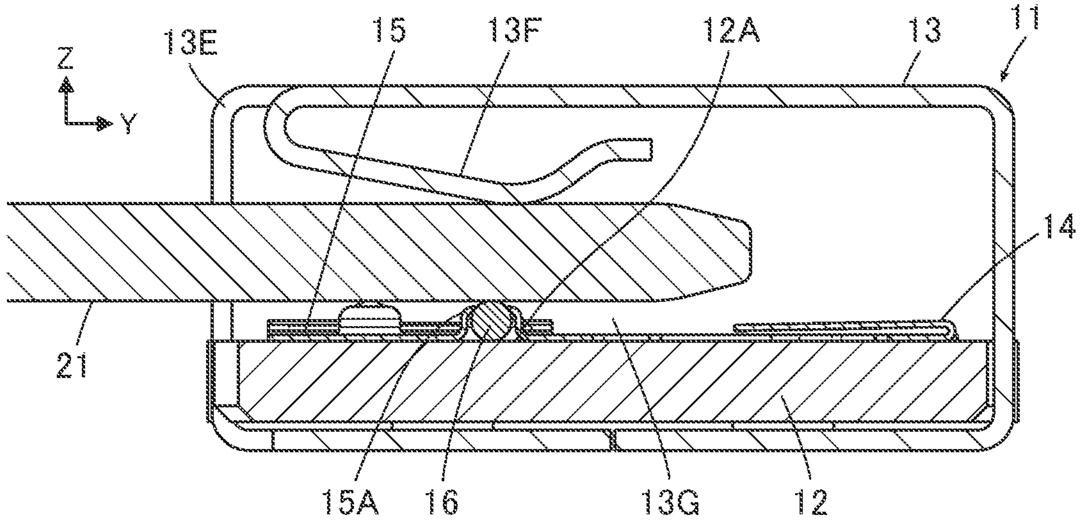
FIG. 9 is a cross-sectional view taken along line A-A in FIG. 8.

In this process, the tip end of the counter connector terminal 21 on the +Y direction side is inserted into the counter connector terminal housing portion 13G formed between the terminal spring 13F and the connection surface 12A of the connector terminal 12 while elastically compressing the terminal spring 13F of the terminal spring retaining portion 13 toward the +Z direction, and is pressed by the terminal spring 13F in a direction approaching the connection surface 12A of the connector terminal 12, i.e., in the −Z direction, as shown in FIG. 9.

Consequently, the surface of the counter connector terminal 21 on the −Z direction side makes contact at a predetermined contact pressure with the +Z directional ends of the balls 16 retained in the three ball retaining portions 15A, the +Z directional ends protruding from the ball retaining portions 15A in the +Z direction, and this allows the −Z directional ends of the balls 16 retained in the three ball retaining portions 15A to contact the contact surface 12A of the connector terminal 12 at the predetermined contact pressure.

Thus, the counter connector terminal 21 and the connector terminal 12 are electrically connected to each other via the three balls 16.

The three balls 16 contact the surface, on the −Z direction side, of the counter connector terminal 21 and the contact surface 12A of the connection terminal 12 at the predetermined contact pressure, and accordingly, are urged to move in the +Y direction while rotating with the insertion movement of the counter connector terminal 21 into the counter connector terminal housing portion 13G. The retaining plate 15 provided with the three ball retaining portions 15A moves together with the three balls 16 in the +Y direction along the connection surface 12A of the connector terminal 12.

Figure 10:
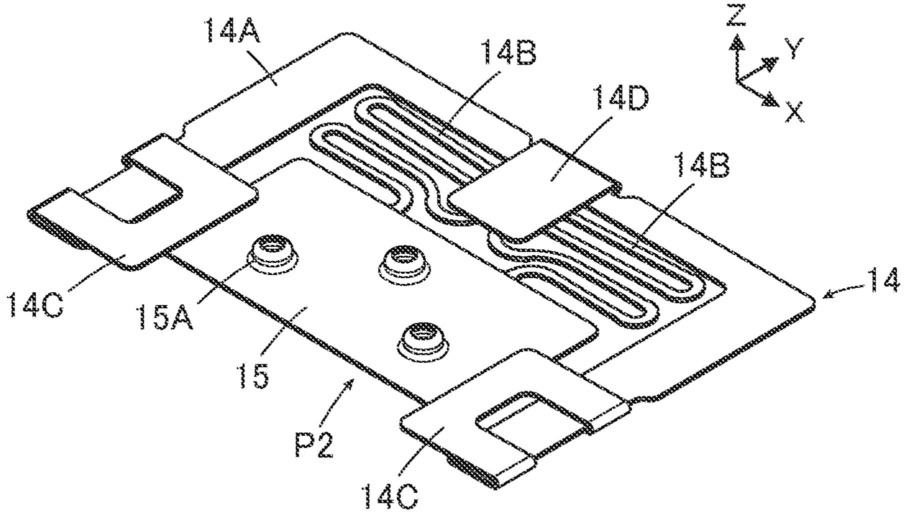
FIG. 10 is a perspective view showing a state where the retaining plate is displaced with respect to the ball guiding portion.

That is, the retaining plate 15 situated at an initial position P1 with respect to the fixed portion 14A of the ball guiding portion 14 as shown in FIGS. 3 and 4 before insertion of the counter connector terminal 21 moves in the +Y direction while elastically compressing the two return springs 14B and are displaced to a position P2 as shown in FIG. 10 after insertion of the counter connector terminal 21.

In this process, the retaining plate 15 and the two return springs 14B are prevented from being displaced in the +Z direction perpendicular to the connection surface 12A of the connector terminal 12 owing to the presence of the pair of retaining plate keeping portions 14C and the return spring keeping portion 14D of the ball guiding portion 14.

Thus, the three balls 16 disposed between the counter connector terminal 21 and the connector terminal 12 move in the +Y direction while rotating, and this makes it possible to reduce sliding resistance associated with insertion of the counter connector terminal 21 into the counter connector terminal housing portion 13G.

Likewise, sliding resistance can be reduced also when the counter connector terminal 21 connected to the connector terminal 12 is pulled out from the counter connector terminal housing portion 13G.

Further, the retaining plate 15 is held to be movable with respect to the fixed portion 14A of the ball guiding portion 14 not only in the Y direction but in a two-dimensional manner in an XY plane; therefore, when the counter connector terminal 21 is inserted into or pulled out from the counter connector terminal housing portion 13G, if the counter connector terminal 21 moves relative to the connector terminal 12 in a direction different from the Y direction, the three balls 16 can also move in the same direction as the direction of movement of the counter connector terminal 21.

Figure 11:
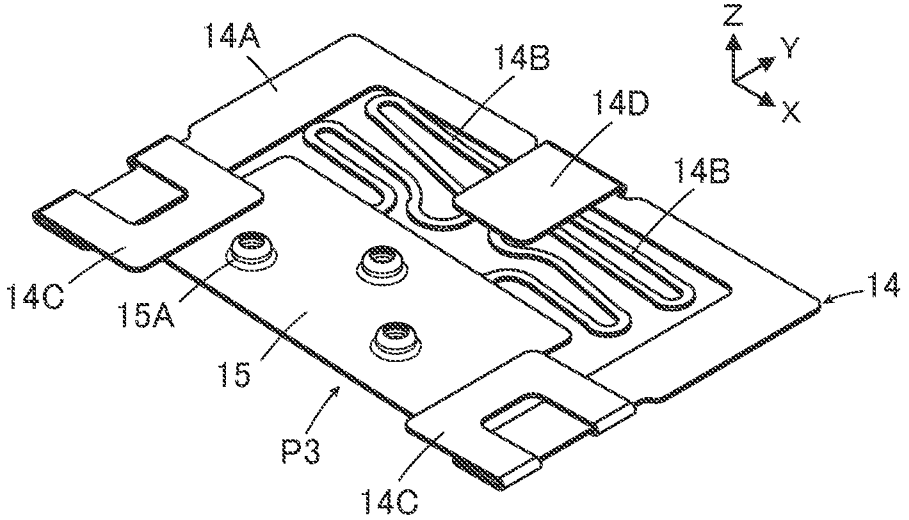
FIG. 11 is a perspective view showing another state where the retaining plate is displaced with respect to the ball guiding portion.

Consequently, the retaining plate 15 is displaced to, for example, a position P3 as shown in FIG. 11, thus reducing sliding resistance.

Aside from that, the counter connector terminal 21 may move relative to the connector terminal 12 not only when it is inserted into or pulled out from the counter connector terminal housing portion 13G but also in the connected state with the connector terminal 12 because of an external force such as vibration acting on the connector 11. However, even when the counter connector terminal 21 moves relative to the connector terminal 12 in any direction in an XY plane, the retaining plate 15 can move together with the three balls 16 in the same direction as the direction of movement of the counter connector terminal 21. Thus, sliding resistance can be reduced, and the connector terminal 12 and the counter connector terminal 21 can be electrically connected to each other with high reliability.

When the connected state between the connector terminal 12 and the counter connector terminal 21 is released and the counter connector terminal 21 is pulled out from the counter connector terminal housing portion 13G, the retaining plate 15 returns to the initial position P1 shown in FIGS. 3 and 4 along the connection surface 12A of the connector terminal 12 due to the action of the two return springs 14B.

The number of balls 16 rotatably retained in the retaining plate 15 is not limited to three; one, two, four or more ball retaining portions 15A may be formed in the retaining plate 15 to retain one, two, four or more balls 16. However, the use of three balls 16 as illustrated in Embodiment 1 above is preferable because this can stabilize the attitude of the counter connector terminal 21 with respect to the connector terminal 12 and also because it is possible to form a large current path between the counter connector terminal 21 and the connector terminal 12 compared to the case of using one or two balls 16.

The number of return springs 14B of the ball guiding portion 14 is not limited to two, and one, three or more return springs 14B may be used to hold the retaining plate 15 at the fixed portion 14A.

In Embodiment 1 above, the terminal spring 13F of the terminal spring retaining portion 13 contacts the counter connector terminal 21 inserted in the counter connector terminal housing portion 13G and presses the counter connector terminal 21 against the connection surface 12A of the connector terminal 12 as shown in FIG. 9; however, the invention is not limited thereto.

It is sufficient that the terminal spring retaining portion 13 has a terminal spring that presses the counter connector terminal 21 inserted in the counter connector terminal housing portion 13G and/or the connection surface 12A of the connector terminal 12 in such a direction that the counter connector terminal 21 and the connection surface 12A approach each other. For instance, it may be configured such that the connector terminal 12 is pressed against the counter connector terminal 21 by a terminal spring to allow the ball 16 to contact the surface, on the −Z direction side, of the counter connector terminal 21 and the connection surface 12A of the connector terminal 12 at a predetermined contact pressure.

Embodiment 2

In Embodiment 1 above, the arrangement positions of the three ball retaining portions 15A are fixed in the retaining plate 15, and the retaining plate 15 is held to be movable as a whole in a two-dimensional manner with respect to the fixed portion 14A by use of the return springs 14B of the ball guiding portion 14; however, the invention is not limited thereto.

Figure 12:
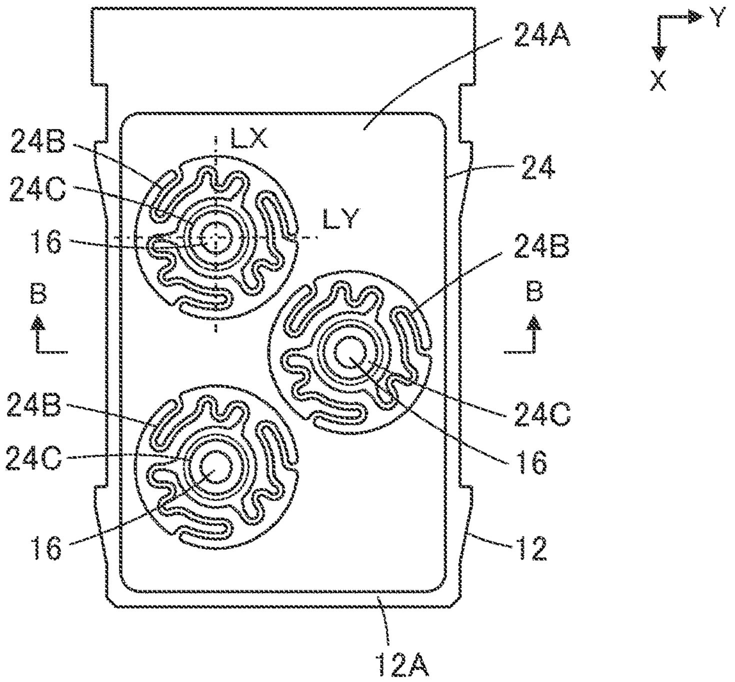
FIG. 12 is a plan view of a connector terminal, a ball guiding portion fixed to the connector terminal, and plural ball retaining portions held by the ball guiding portion for use in Embodiment 2.

FIG. 12 shows a ball guiding portion 24 used in a connector according to Embodiment 2. The ball guiding portion 24 is constituted of a plate member such as a metal plate, and includes a fixed portion 24A having a rectangular outer shape and fixed to the connection surface 12A of the connector terminal 12. Three circular openings C are formed in the fixed portion 24A, and a ball retaining portion 24C held by three return springs 24B is disposed within each opening C.

The ball retaining portion 24C is held at an initial position in the center of the corresponding circular opening C, i.e., at the position of intersection of two straight lines LX and LY along two diameters of the opening C extending in the X direction and the Y direction. The three ball retaining portions 24C held in the three openings C are arranged substantially at three apexes of an isosceles triangle so as not to align in one straight line.

Each return spring 24B is formed from a band-like member bent at plural positions in an XY plane. One end of the return spring 24B is connected to the fixed portion 24A at an edge of the corresponding opening C, and the other end thereof is connected to the corresponding ball retaining portion 24C. Thus, the return spring 24B is formed to be elastically deformable in an XY plane.

With the configuration as above, the three ball retaining portions 24C are held to be individually movable in a two-dimensional manner in an XY plane.

Figure 13:
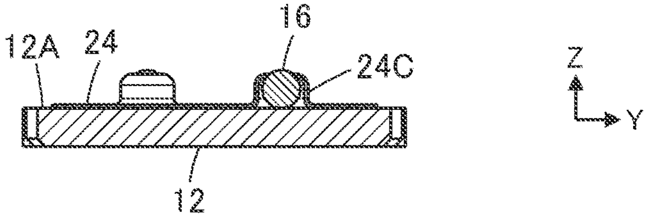
FIG. 13 is a cross-sectional view taken along line B-B in FIG. 12.
Figure 14:
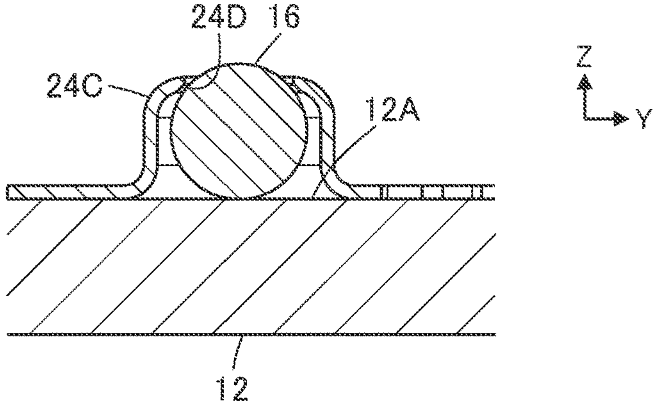
FIG. 14 is an enlarged view of an important part of FIG. 13.

The three ball retaining portions 24C each have the same structure as that of the ball retaining portion 15A in Embodiment 1 as shown in FIG. 7. That is, each ball retaining portion 24C has a cylindrical shape protruding in the +Z direction, and the ball 16 is rotatably housed therein, as shown in FIGS. 13 and 14.

The ball retaining portion 24C is provided at its +Z directional end with an opening 24D. The ball 16 is housed in the space surrounded by the connection surface 12A of the connector terminal 12 and the ball retaining portion 24C, and the −Z directional end of the ball 16 contacts the connection surface 12A, while the +Z directional end of the ball 16 protrudes from the opening 24D in the +Z direction.

The fixed portion 24A of the ball guiding portion 24, the plural return springs 24B, and the three ball retaining portions 24C can be integrally formed from, for instance, one metal plate.

Even with the ball guiding portion 24 as above, the counter connector terminal 21 inserted in the counter connector terminal housing portion 13G shown in FIG. 2 and the connector terminal 12 can be electrically connected to each other via the three balls 16 as with Embodiment 1.

Figure 15:
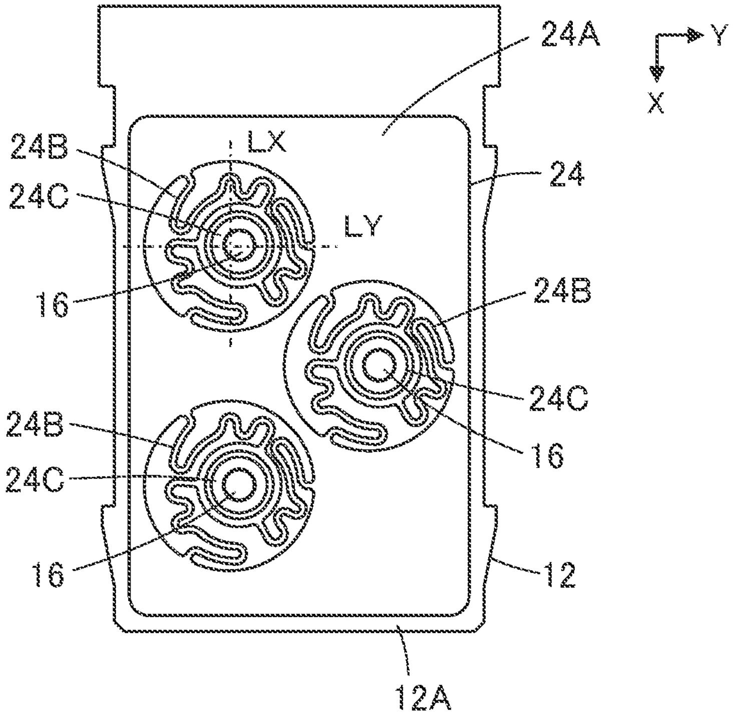
FIG. 15 is a plan view of the connector terminal, the ball guiding portions fixed to the connector terminal, and the plural ball retaining portions held by the ball guiding portion and displaced, for use in Embodiment 2.
Figure 16:
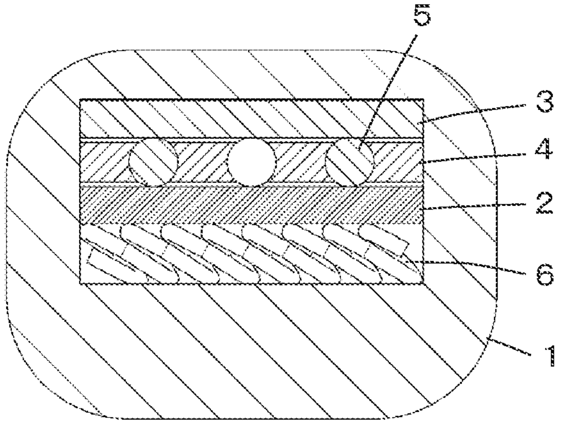
FIG. 16 PRIOR ART
FIG. 16 is a cross-sectional view showing a conventional connector.
Figure 17:
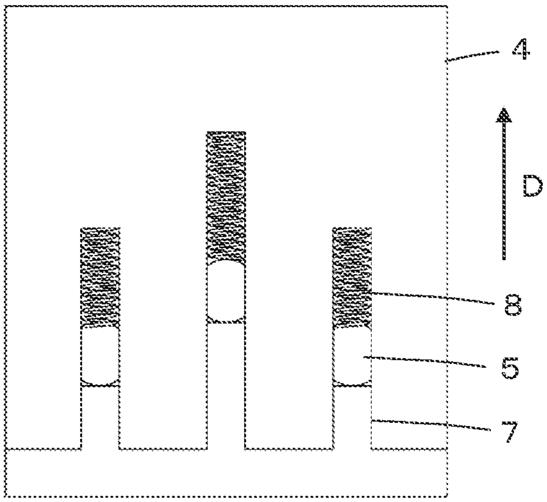
FIG. 17 PRIOR ART
FIG. 17 is a plan view showing a contact holder and three metal balls of the conventional connector.

In addition, when the counter connector terminal 21 moves relative to the connector terminal 12, the three ball retaining portions 24C of the ball guiding portion 24 can move together with the balls 16, which are rotatably retained in the ball retaining portions 24C, in the same direction as the direction of movement of the counter connector terminal 21. In other words, the three ball retaining portions 24C are each individually displaced from the position of intersection of the two straight lines LX and LY of the corresponding opening C, in accordance with movement of the counter connector terminal 21, as shown in FIG. 15.

With this configuration, sliding resistance can be reduced, and the connector terminal 12 and the counter connector terminal 21 can be electrically connected to each other with high reliability.

When the counter connector terminal 21 is pulled out from the counter connector terminal housing portion 13G, the three ball retaining portions 24C of the ball guiding portion 24 each return to the initial position shown in FIG. 12 along the connection surface 12A of the connector terminal 12 due to the action of the connected three return springs 24B.

The number of return springs 24B holding the ball retaining portion 24C movably in a two-dimensional manner within each opening C of the ball guiding portion 24 is not limited to three, and one, two, four or more return springs 24B may be used to hold the ball retaining portion 24C.

What is claimed is:

1. A connector having a counter connector terminal housing portion in which a part of a counter connector terminal is inserted, the connector comprising:

a connector terminal having a connection surface in a flat shape that faces the counter connector terminal inserted in the counter connector terminal housing portion;

at least one ball in a spherical shape that is disposed on the connection surface, at least a surface of the ball having electrical conductivity;

a ball retaining portion retaining the ball such that the ball is rotatable in a state where a part of the surface of the ball contacts the connection surface and another part of the surface of the ball facing opposite from the connection surface protrudes;

a ball guiding portion fixed to the connector terminal and holding the ball retaining portion such that the ball retaining portion is movable in a two-dimensional manner along the connection surface; and a terminal spring pressing the counter connector terminal inserted in the counter connector terminal housing portion or the connection surface of the connector terminal in such a direction that the counter connector terminal and the connection surface approach each other, wherein the counter connector terminal inserted in the counter connector terminal housing portion is pressed against the connection surface by the terminal spring, contacts a protruding part of the surface of the ball retained by the ball retaining portion, and is electrically connected to the connector terminal via the ball.

2. The connector according to claim 1, comprising a terminal spring retaining portion attached to the connector terminal and retaining the terminal spring such that the terminal spring faces the connection surface, wherein the counter connector terminal housing portion is formed between the terminal spring and the connection surface.

3. The connector according to claim 1, wherein the ball guiding portion includes a fixed portion fixed to the connector terminal and a return spring connected to the fixed portion and returning the ball retaining portion to an initial position on the connection surface, and the ball retaining portion moves in a two-dimensional manner along the connection surface in accordance with movement of the counter connector terminal when the counter connector terminal is inserted into the counter connector terminal housing portion and in a connected state between the counter connector terminal and the connector terminal, and returns to the initial position due to action of the return spring when the counter connector terminal is pulled out from the counter connector terminal housing portion.

4. The connector according to claim 3, wherein the return spring extends along the connection surface and is formed from a band-like member being bent.

5. The connector according to claim 3, wherein the ball retaining portion is formed integrally with the fixed portion and the return spring of the ball guiding portion.

6. The connector according to claim 5, wherein the ball guiding portion is formed from one plate member.

7. The connector according to claim 3, comprising a plurality of balls each of which is identical to the ball, and a plurality of ball retaining portions each of which is identical to the ball retaining portion, the plurality of ball retaining portions retaining the plurality of balls such that the plurality of balls are each rotatable.

8. The connector according to claim 7, comprising three balls each of which is identical to the ball and which are disposed on the connection surface so as not to be aligned in a straight line, and three ball retaining portions each of which is identical to the ball retaining portion.

9. The connector according to claim 7, comprising a retaining plate formed integrally with the plurality of ball retaining portions, wherein the return spring is connected to the retaining plate.

10. The connector according to claim 9, wherein the ball guiding portion includes a retaining plate keeping portion that prevents the retaining plate from being displaced from the connection surface in a direction perpendicular to the connection surface.

11. The connector according to claim 9, wherein the ball guiding portion includes a return spring keeping portion that prevents the return spring from being displaced from the connection surface in a direction perpendicular to the connection surface.

12. The connector according to claim 7, wherein the ball guiding portion includes a plurality of return springs corresponding to the plurality of ball retaining portions, the plurality of return springs being each identical to the return spring, and the plurality of ball retaining portions are held by the ball guiding portion to be individually movable in a two-dimensional manner along the connection surface.

* * * * *